Aug. 6, 1929.    R. M. NORSTROM    1,723,655
FLEXIBLE COUPLING
Filed Dec. 10, 1926
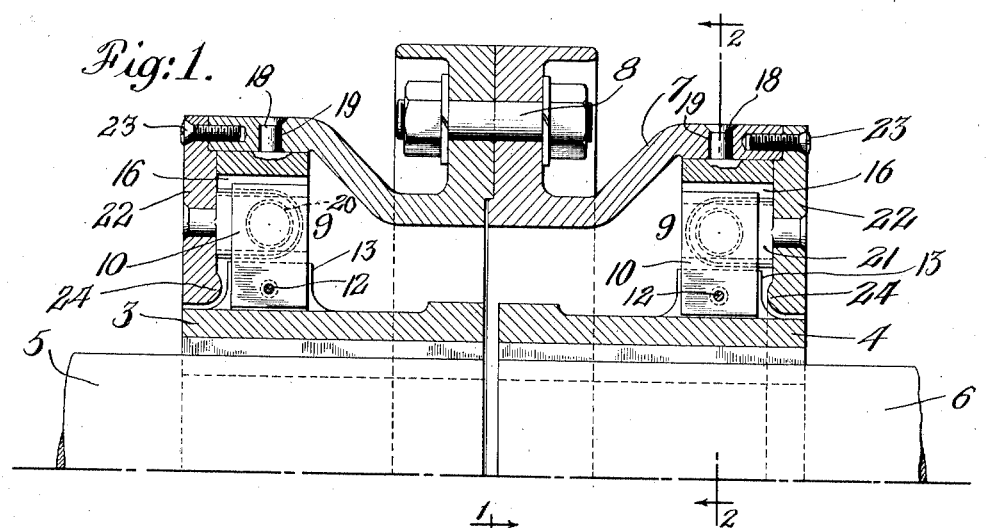
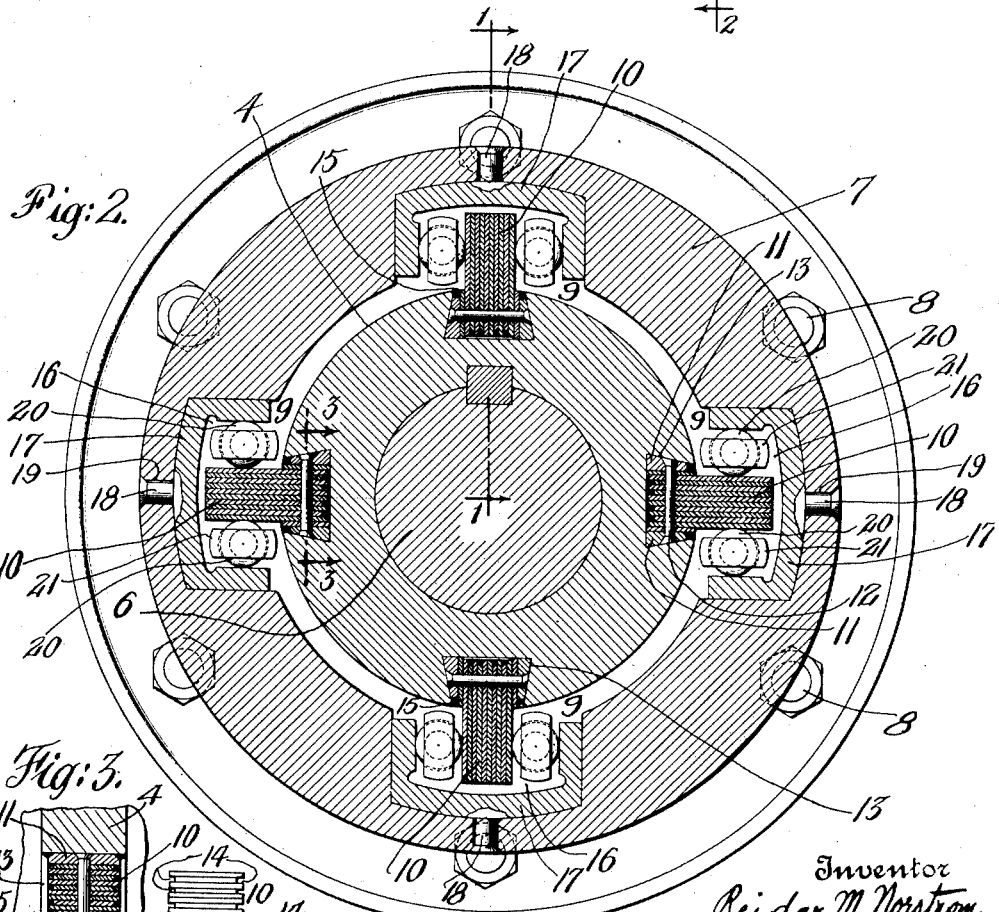
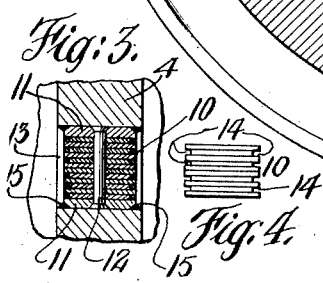
Inventor
Reidar M. Norstrom
By his Attorneys
Symmestvedt & Lechner Patented Aug. 6, 1929.

1,723,655

UNITED STATES PATENT OFFICE.

REIDAR M. NORSTROM, OF AUDUBON, NEW JERSEY.

FLEXIBLE COUPLING.

Application filed December 10, 1926. Serial No. 153,766.

This invention relates to improvements in flexible couplings for drivingly connecting two shafts in such manner that inaccuracies in alinement of the shafts are compensated for.

It is a primary object of this invention to provide a coupling of the character described in which friction in the flexible elements is very materially reduced.

Another object of the invention is the provision of an improved flexible coupling which will have greater life, and which is simple in construction and effective in operation.

How the foregoing together with such other objects and advantages as may hereinafter appear or are incident to my invention, are realized is illustrated in preferred form in the accompanying drawings, wherein:

Fig. 1 is a vertical longitudinal section thru the upper half of my improved coupling with certain of the parts appearing in elevation, the section being taken on the line 1—1 of Fig. 2;

Fig. 2 is a transverse sectional view taken on the line 2—2 of Fig. 1, this view however being complete;

Fig. 3 is a detailed fragmentary section taken on the line 3—3 of Fig. 2; and

Fig. 4 is an end view of a projection or tongue employed in my coupling.

My improved coupling comprises in general, two members 3 and 4 which are fixed in any suitable manner to the adjacent ends of the two shafts 5 and 6; a member 7 encircling the shaft members 3 and 4 which is constructed, in this instance, of two flanged parts fastened together by means of bolts 8; and flexible anti-friction connections 9 between the members 3 and 4 and the encircling member 7.

The members 3 and 4 are each provided with a plurality of radially disposed flexible projections or tongues 10, in this instance four being shown. These projections or tongues are preferably of laminated construction and are composed of a plurality of spring plates secured together in any suitable manner. As here shown the plates are secured together, adjacent one end, by means of clamp pieces 11 and rivets 12. These clamp pieces have tapered outer surfaces by virtue of which they are adapted to fit the correspondingly tapered slots 13 in the members 3 and 4, the tapers being in such direction that a dove-tailed connection is provided. It is to be observed that some of the plates of the laminar projections are narrower and shorter than others and that these plates are so arranged when assembled that a plurality of grooves 14 are provided in the sides of the tongues and in the end at which they are clamped together. The grooves in the end of the tongues and that portion of the side grooves where the plates are gripped together are filled with welding material to more securely hold the laminæ together. The projections or tongues are welded to the members 3 and 4, as indicated at 15 (see Figs. 2 and 3).

The encircling or floating member 7 is provided with a plurality of grooves 16 for receiving the projections or tongues 10, which grooves are provided with inserts 17 preferably of hard metal for a purpose hereinafter appearing. These inserts are secured in place by riveting over the studs 18 which pass thru holes 19 provided in the member 7. The holes 19 are preferably larger in diameter than the studs so as to avoid the necessity for extreme accuracy in locating the holes and to insure proper seating of the insert in the groove in cases where the stud 18 is formed integral with the insert.

It will be seen that the width of the grooves 16 is greater than the width of the tongues 10, and that the tongues are centrally disposed in the grooves so that a space is provided at each side of the tongues for receiving the anti-friction balls 20, 20, which contact with the grooves and tongues. In this connection, it is pointed out that by employing anti-friction balls contacting with flat surfaces, the balls, at all times, have absolute freedom for rolling movement which reduces the friction and increases the life of the coupling. By providing such rolling contact power losses in transmitting drive from one shaft to the other is very materially reduced, due to the absence of friction. It is also pointed out that by employing anti-friction connections of the above character, the introduction of foreign stresses in the coupled elements is very materially reduced.

The balls 20, 20, are carried by members 21 which are secured in any suitable manner to the carriers 22 in the form of flat rings. These carriers are secured as by means of screws 23 to the edges of the encircling member 7. It is pointed out that the inner edge of the carrier is of a diameter slightly greater than the outside diameter of the members 3 and 4 at their end portions, whereby relative movement of said parts, due to any misalignment of the shafts, may take place when the shafts are rotating. The carriers 22 are provided with ribs 24 which serve as abutments to limit the longitudinal displacement of the grooved member 7. It will also be observed that these carriers serve to prevent dirt from entering to the interior of the coupling.

While I have shown but one anti-friction ball at each side of the tongues it is to be understood that a plurality thereof may be employed without departing from the scope of the invention.

From the foregoing, it will be seen that I have provided an improved coupling in which friction is reduced to a minimum by virtue of the fact that there is only point contact between the flexible projections 10 and the wear resisting members or linings 17 of the grooves 16. By providing these wear resisting inserts the life of the coupling is greatly increased without very materially increasing the cost of manufacture. It is to be understood that the flexible members 10 and the grooves 16 may be reversed without departing from the scope of this invention, that is to say, the floating member 7 may be provided with the projections 10 and the members 3 and 4 with the grooves 16.

I claim:—

1. A flexible coupling for shafts comprising members fixed to the shaft ends, a plurality of flexible projections carried by said members, a member encircling said shaft members having a plurality of grooves for receiving said projections, and anti-friction means cooperating with said projections and said grooves to transmit drive from one shaft member to the other.

2. A flexible coupling for shafts comprising members fixed to the shaft ends, a plurality of flexible projections carried by said members, a member encircling said shaft members having a plurality of grooves for receiving said projections, and anti-friction means cooperating with said projections and said grooves to transmit drive from one shaft member to the other, said anti-friction means including anti-friction balls and wear resisting members.

3. A flexible coupling for shafts comprising members fixed to the shaft ends, a plurality of radially disposed flexible projections carried by said members, a member having a plurality of grooves for receiving said projections, a plurality of anti-friction balls contacting with the projections and the grooves, a carrier for said balls, and means for preventing displacement of the grooved member.

4. A flexible coupling for shafts comprising a member fixed to the end of one shaft, a floating member encircling said shaft member, a plurality of flexible projections carried by one of said members, a plurality of grooves in the other member for receiving the projections, and anti-friction means cooperating with said projections and grooves to transmit drive from one member to the other.

5. A flexible coupling for shafts comprising a member fixed to the end of one shaft, a floating member encircling said shaft member, a plurality of flexible projections carried by one of said members, a plurality of grooves in the other member for receiving the projections, anti-friction means cooperating with said projections and grooves to transmit drive from one member to the other, and means for connecting said floating member to the other shaft end.

In testimony whereof, I have hereunto signed my name.

REIDAR M. NORSTROM.